(12) United States Patent
Merino Almeida et al.

(10) Patent No.: US 10,173,485 B2
(45) Date of Patent: Jan. 8, 2019

(54) SLIDING TRAILER HITCH COVER FOR A MOTOR VEHICLE

(71) Applicant: FORD GLOBAL TECHNOLOGIES, LLC, Dearborn, MI (US)

(72) Inventors: Carlos Emilio Merino Almeida, Benito Juarez (MX); Jonatan Leff Yaffe, Mexico City (MX); Jorge Manuel Rodriguez Vazquez, Atizapan de Zaragoza (MX)

(73) Assignee: Ford Global Technologies, LLC, Dearborn, MI (US)

( * ) Notice: Subject to any disclaimer, the term of this patent is extended or adjusted under 35 U.S.C. 154(b) by 122 days.

(21) Appl. No.: 14/943,480

(22) Filed: Nov. 17, 2015

(65) Prior Publication Data

US 2017/0136837 A1    May 18, 2017

(51) Int. Cl.
*B60D 1/01* (2006.01)
*B60D 1/60* (2006.01)
*B60R 13/00* (2006.01)
*B60J 5/12* (2006.01)
*B60R 19/48* (2006.01)

(52) U.S. Cl.
CPC ............. *B60D 1/60* (2013.01); *B60J 5/12* (2013.01); *B60R 13/00* (2013.01); *B60R 19/48* (2013.01)

(58) Field of Classification Search
CPC ........... B60D 1/60; B60J 5/06; E05D 15/1081
USPC ........................................................ D12/162
See application file for complete search history.

(56) References Cited

U.S. PATENT DOCUMENTS

| | | | | |
|---|---|---|---|---|
| 2,984,516 A | * | 5/1961 | Wilfert | B60J 5/06 49/410 |
| 3,386,204 A | * | 6/1968 | Obata | B60J 5/06 49/212 |
| 4,887,390 A | * | 12/1989 | Boyko | B60J 5/06 49/214 |
| 5,628,536 A | | 5/1997 | Fulkerson | |
| 5,947,506 A | | 9/1999 | Bauer | |
| 6,019,386 A | * | 2/2000 | Morelock | B60D 1/60 280/420 |
| 6,095,546 A | * | 8/2000 | Austin | B60D 1/485 280/507 |
| 6,145,865 A | * | 11/2000 | Cannara | B60R 3/02 280/491.1 |
| 6,189,910 B1 | * | 2/2001 | Bartel | B60D 1/06 280/491.1 |
| 6,328,374 B1 | * | 12/2001 | Patel | B60J 5/06 296/155 |
| 6,439,595 B1 | | 8/2002 | Cheng et al. | |
| 6,793,268 B1 | * | 9/2004 | Faubert | B60J 5/06 296/146.11 |
| 6,874,806 B1 | * | 4/2005 | Blake | B60D 1/485 150/166 |
| 6,908,096 B2 | | 6/2005 | Lewis et al. | |

(Continued)

*Primary Examiner* — Tony H Winner
(74) *Attorney, Agent, or Firm* — Jason Rogers; King & Schickli, PLLC

(57) ABSTRACT

A trailer hitch cover assembly is provided. That trailer hitch cover assembly includes a guide track and two cooperating doors received for sliding movement in the guide track and displaceable between a closed position and an open position. A motor vehicle incorporating the trailer hitch cover assembly and a method of hiding a hitch receiver are also disclosed.

9 Claims, 4 Drawing Sheets

(56) References Cited

U.S. PATENT DOCUMENTS

| | | | | |
|---|---|---|---|---|
| 6,969,084 | B2* | 11/2005 | Kaepp | B60D 1/485 |
| | | | | 280/500 |
| 9,555,677 | B1* | 1/2017 | Merino Almeida | B60D 1/60 |
| 2003/0189313 | A1* | 10/2003 | Sievers | B60D 1/06 |
| | | | | 280/507 |
| 2004/0104557 | A1* | 6/2004 | Kaepp | B60D 1/485 |
| | | | | 280/495 |
| 2004/0232653 | A1* | 11/2004 | Kaepp | B60D 1/485 |
| | | | | 280/500 |
| 2005/0121880 | A1* | 6/2005 | Santangelo | B60D 1/60 |
| | | | | 280/507 |
| 2007/0062118 | A1* | 3/2007 | Lindemann | B60J 5/06 |
| | | | | 49/209 |
| 2009/0039618 | A1* | 2/2009 | Takemura | B60D 1/60 |
| | | | | 280/507 |
| 2011/0026268 | A1* | 2/2011 | Omura | B29C 45/0025 |
| | | | | 362/548 |
| 2016/0129769 | A1* | 5/2016 | Choi | B60J 5/0479 |
| | | | | 49/120 |
| 2016/0356069 | A1* | 12/2016 | Choi | B60J 5/06 |

* cited by examiner

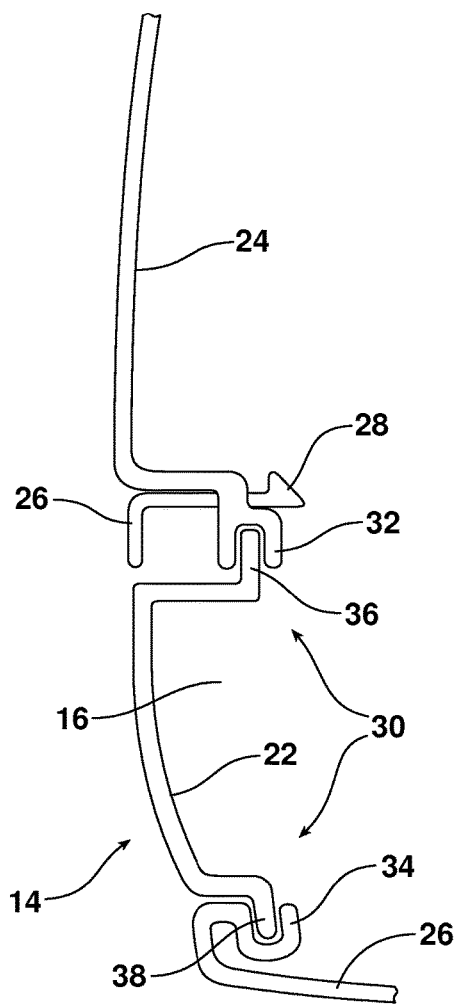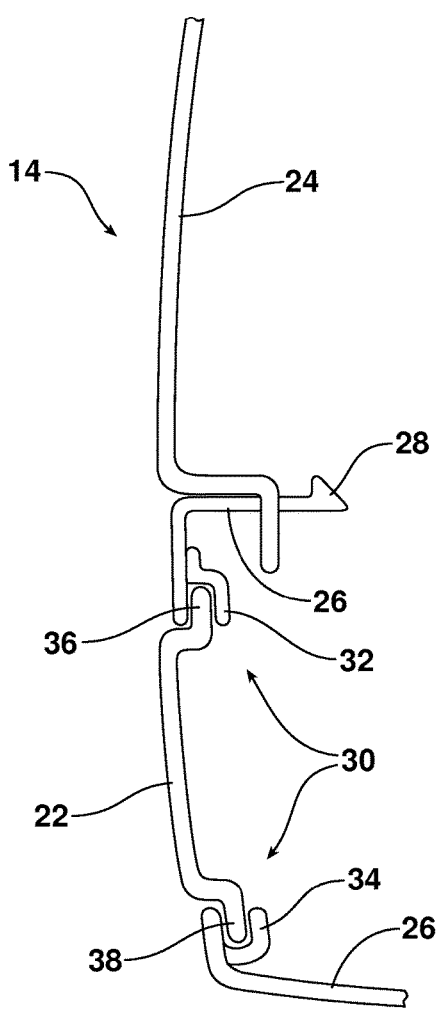

SLIDING TRAILER HITCH COVER FOR A MOTOR VEHICLE

TECHNICAL FIELD

This document relates generally to the motor vehicle equipment field and, more particularly, to a sliding trailer hitch cover.

BACKGROUND

Many individuals utilize their motor vehicles to tow trailers laden with such items as boats, personal watercraft, all-terrain vehicles, motorcycles, camping equipment and the like. Thus receiver-type trailer hitches have become increasingly popular and are now provided on all types of motor vehicles including not only pickup trucks but also sport utility vehicles, crossover vehicles, minivans, station wagons and even sedans. Typically the trailer hitch receivers are provided in a recess behind the motor vehicle bumper. A trailer hitch cover is provided over the trailer hitch receiver when not in use in order to increase visual styling and aesthetic appeal of the motor vehicle.

This document relates to a new and improved trailer hitch cover assembly incorporating two cooperating doors. Those doors slide apart in order to access the trailer hitch receiver and slide together in order to cover the trailer hitch receiver with a decorative fascia matching the rest of the bumper.

SUMMARY

In accordance with the purposes and benefits described herein, a trailer hitch cover assembly is provided. That trailer hitch cover assembly comprises a guide track and two cooperating doors received for sliding movement in the guide track. Those doors are displaceable between a closed position and an open position. More specifically, the two cooperating doors slide together when closed and slide apart when opened.

A first door of the two doors has a first edge and a second door of the two doors has a second edge. The first edge meets with the second edge when the first door and the second door are closed. Thus, the first door and the second door slid outward in opposed directions when displaced from the closed position to the opened position. In contrast, the first door and the second door slide inward in opposed directions when displaced from the opened position to the closed position.

In accordance with an additional aspect, a motor vehicle is provided. That motor vehicle comprises a bumper fascia having a hitch opening, a guide track carried on the bumper fascia adjacent the hitch opening, a first door received for sliding movement along the guide track and a second door received for sliding movement along the guide track. Further the motor vehicle includes a hitch receiver that is carried in a recess behind the bumper fascia and accessed through the hitch opening. As will be appreciated, the first door and the second door are displaceable between a closed position closing the hitch opening and an opened position opening the hitch opening and allowing access to the hitch receiver.

In one possible embodiment, the guide track extends in a substantially horizontal plane in a transverse direction across the bumper fascia. The first and second door slide together when closed and slide apart toward opposed ends of the bumper fascia when opened.

More specifically the guide track may include a first channel along a top margin of the hitch opening and a second channel along a bottom margin of the hitch opening. The first and second door both include a first track follower along an upper margin and a second track follower along a lower margin. The first track follower is received and slides along the first channel while the second track follower is received and slides along the second channel. In one possible embodiment the first door and the second door slide over the bumper fascia when opened. In another possible embodiment the first door and the second door slide behind the bumper fascia when opened.

In accordance with still another aspect, a method is provided for hiding or concealing a hitch receiver behind a bumper fascia of a motor vehicle. That method may be broadly described as comprising the step of covering an opening in the bumper fascia for accessing the hitch receiver with two doors. The method may further include sliding those two doors together to close the opening. Further the method may include sliding the two doors apart to open the opening and access the hitch receiver.

In the following description, there are shown and described several preferred embodiments of the trailer hitch cover assembly and the motor vehicle. As it should be realized, the cover assembly and motor vehicle are capable of other, different embodiments and their several details are capable of modification in various, obvious aspects all without departing from the cover assembly and motor vehicle as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the trailer hitch cover assembly and motor vehicle and together with the description serve to explain certain principles thereof. In the drawing figures:

FIGS. 4 and 5 are detailed cross-sectional views illustrating two alternative embodiments of a motor vehicle including particularly a bumper fascia incorporating a guide track in the form of two opposed channels that receive upper and lower margins of the doors allowing the doors to slide between the opened and closed positions.

Reference will now be made in detail to the present preferred embodiments of the trailer hitch cover assembly and motor vehicle, examples of which are illustrated in the accompanying drawing figures.

DETAILED DESCRIPTION

Figure 1:
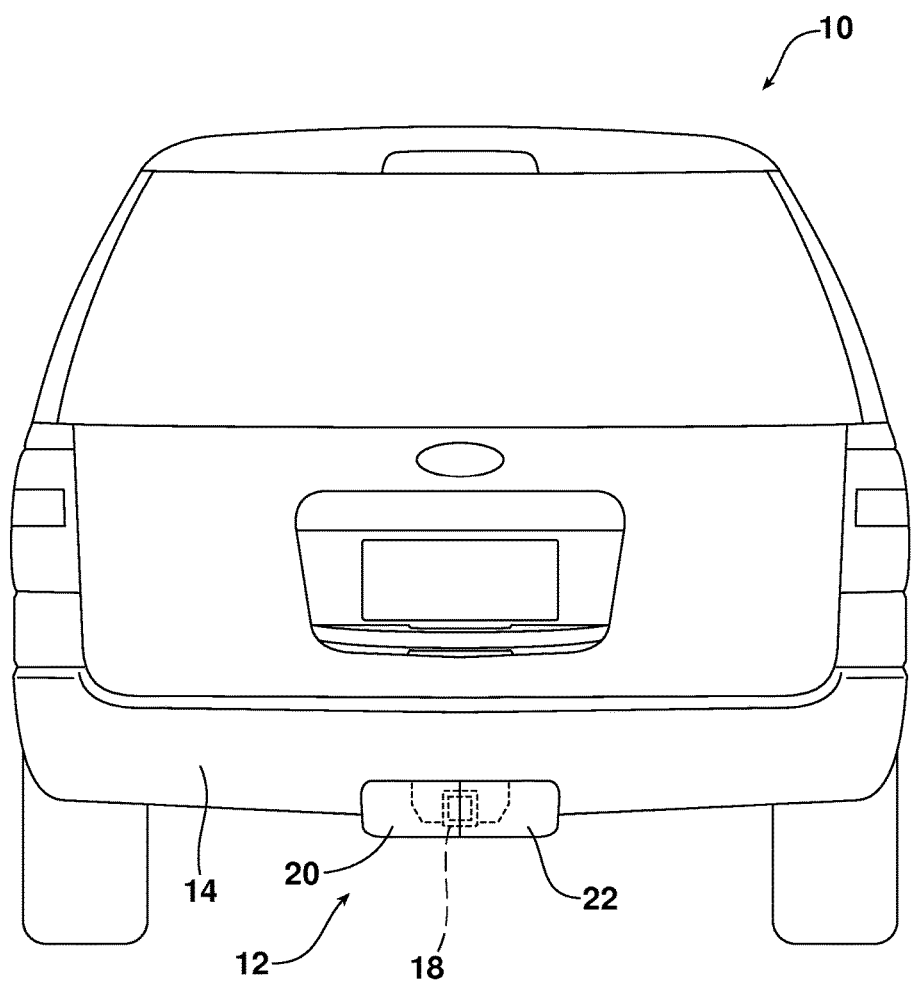
FIG. 1 is a rear elevational view of a motor vehicle equipped with the trailer hitch cover assembly. That trailer hitch cover assembly is illustrated in the closed position.
Figure 2:
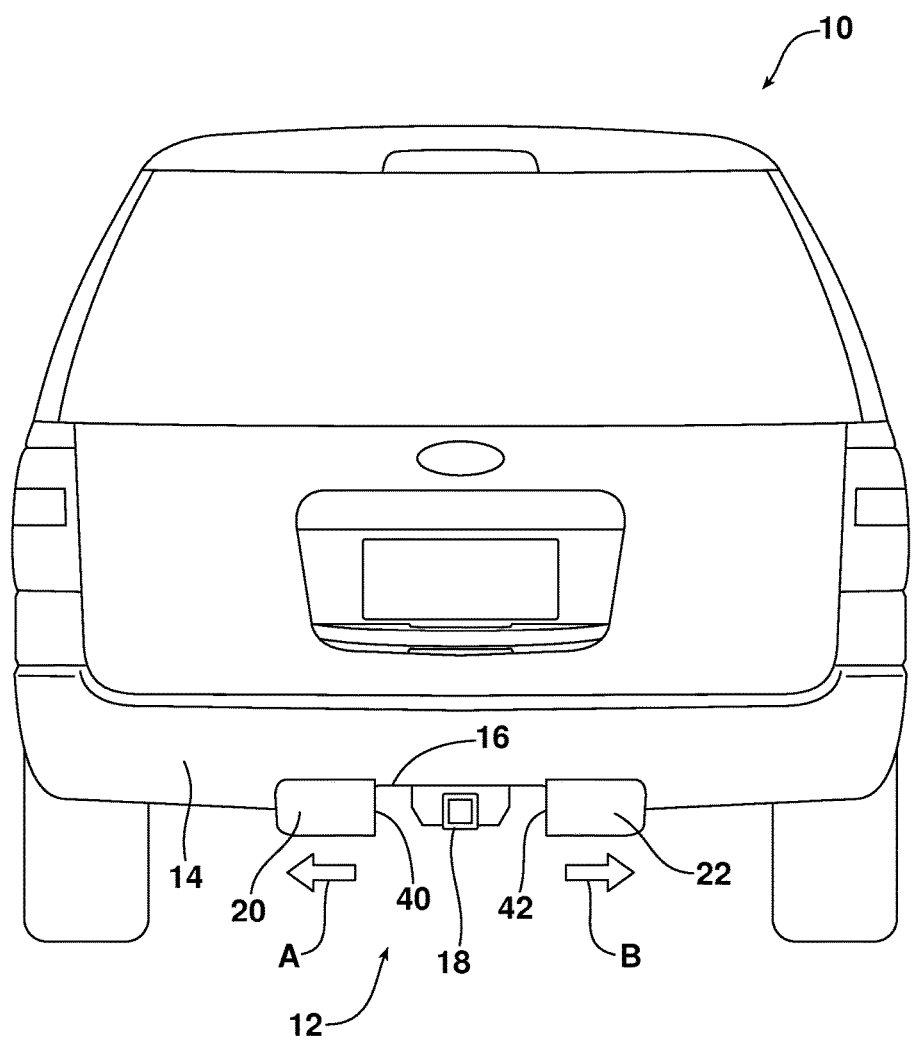
FIG. 2 is a view similar to FIG. 1 but illustrating the trailer hitch cover assembly with the doors in the opened position to allow access to a trailer hitch receiver.

Reference is now made to FIGS. 1 and 2 illustrating a motor vehicle 10 incorporating a first embodiment of trailer hitch cover assembly 12. As illustrated, the motor vehicle 10 includes a bumper fascia 14 having a hitch opening 16. A hitch receiver 18 is carried in a recess behind the bumper fascia 14. That hitch receiver 18 is accessed through the hitch opening 16. Two cooperating doors 20, 22 are received for sliding movement with respect to the bumper fascia 14 and are displaceable between a closed position illustrated in FIG. 1 and an opened position illustrated in FIG. 2. As illustrated, when the doors 20, 22 are opened the operator may access the hitch receiver 18, through the hitch opening 16 in the bumper fascia 14.

In the embodiments illustrated in FIGS. 1 and 2, one opens the doors 20, 22 by sliding the first door 20 in a first direction A and the second door 22 in a second, opposite direction B (note action arrows of FIG. 2). Thus it should be appreciated that the doors 20, 22 are displaced outward in opposed directions when opened, in order to gain access to the hitch receiver 18.

After use, the open doors 20, 22 are displaced together by sliding along the guide track 30 until the first edge 40 on the first door 20 and the second edge 42 on the second door 22 meet thereby fully closing the hitch opening and concealing the hitch receiver 18 (see FIG. 1). As shown in FIGS. 1 and 2, the doors 20, 22 slide over the bumper fascia 14.

Figure 3:
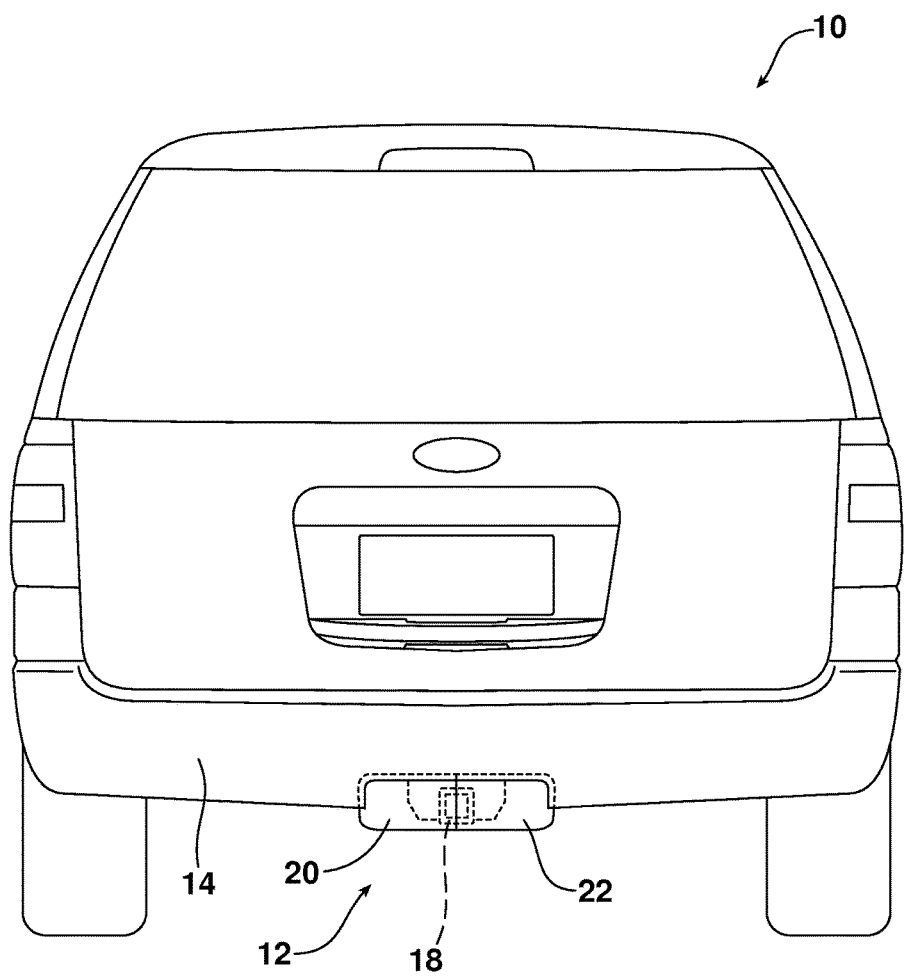
FIG. 3 is a rear elevational view of an alternative embodiment of the trailer hitch cover assembly wherein the upper portion of the doors are received behind the bumper fascia.

In contrast, as illustrated in the alternative embodiment illustrated in FIG. 3, the doors slide open and closed behind the bumper fascia 14.

In the embodiment illustrated in FIG. 4, the bumper fascia 14 comprises an upper section 24 and a lower section 26. In the illustrated embodiment, the lower section 26 includes a series of resilient fasteners 28 that are received in spaced apertures (not shown) on the upper section 24. As further illustrated, the bumper fascia 14 includes a guide track 30. The guide track 30 extends in a substantially horizontal plane in a transverse direction across the bumper fascia 14.

As illustrated in FIG. 4, the guide track 30 comprises a first channel 32 running along a top margin of the hitch opening 16 and a second channel 34 running along a bottom margin of the hitch opening. In the FIG. 4 embodiment, the first channel 32 is formed as a part of the upper section 24 of the bumper fascia 14 while the second channel 34 is formed as a portion of a lower section 26 of the bumper fascia.

As also illustrated in FIG. 4, the sliding door 22 includes a first track follower or margin 36 and is received in and slides along the first channel 32 and a second track follower or margin 38 that is received in and slides along the second channel 34. In this embodiment, the channels 32 and 34 are integrally molded as part of the respective sections 24, 26.

In the embodiment illustrated in FIG. 5, the bumper fascia 14 again includes an upper section 24 and a lower section 26 that are again connected together by resilient tabs or fasteners 28 integrally formed with the lower section. In the FIG. 5 embodiment, the guide track 30 again includes the first and second channels 32, 34. Both of those guide channels 32, 34 are sonic welded to the lower section 26. As illustrated, the door 22 still includes track followers or margins 36, 38 that are received in and slide in the opposed channels 32, 34.

Any of the disclosed embodiments are consistent with a method of hiding or concealing a hitch receiver 18 behind a bumper fascia 14 of a motor vehicle 10. As broadly described, that method comprises covering an opening 16 in the bumper fascia 14 for access to the hitch receiver 18 with two doors 20, 22. Further that method may include sliding the two doors 20, 22 together to close the opening as illustrated in FIGS. 1 and 3 and sliding the two doors apart to open the opening 16 and access the hitch receiver 18 as illustrated in FIG. 2.

The trailer hitch cover assembly 12 described herein has opposed sliding doors 20, 22 that make it more aesthetically pleasing than a cover incorporating a single sliding door. More specifically, whether opened or closed, the trailer hitch cover assembly 12 with dual doors 20, 22 is always balanced as even when open, the two doors have a symmetrical appearance. In contrast, a single sliding door cannot possibly provide such a symmetrical appearance when opened. Thus, the dual, opposed doors 20, 22 of the trailer hitch cover assembly 12 described herein do represent an advance in the art that improves the aesthetic appearance of the motor vehicle 10 and thereby provides the motor vehicle owner with greater ownership satisfaction.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A motor vehicle, comprising;
   a bumper fascia having a hitch opening;
   a guide track carried on said bumper fascia adjacent said hitch opening;
   a first door received for sliding movement along said guide track;
   a second door received for sliding movement along said guide track; and
   a hitch receiver carried in a recess behind said bumper fascia and accessed through said hitch opening;
   wherein said first door and said second door are displaceable between a closed position closing said hitch opening and an open position opening said hitch opening and allowing access to said hitch receiver.

2. The motor vehicle of claim 1, wherein said guide track extends in a substantially horizontal plane in a transverse direction across said bumper fascia.

3. The motor vehicle of claim 2, wherein said front door and said second door slide together when closed and slide apart toward opposed ends of said bumper fascia when opened.

4. The motor vehicle of claim 3, wherein said guide track includes a first channel along a top margin of said hitch opening and a second channel along a bottom margin of said hitch opening.

5. The motor vehicle of claim 4, wherein said first door and said second door both include a first track follower along an upper margin and a second track follower along a lower margin; said first track follower being received and sliding along said first channel and said second track follower being received and sliding along said second channel.

6. The motor vehicle of claim 1, wherein said first door and said second door slide over said bumper fascia when opened.

7. The motor vehicle of claim 1, wherein said first door and said second door slide behind said bumper fascia when opened.

8. A method of hiding a hitch receiver behind a bumper fascia of a motor vehicle, comprising: covering an opening in said bumper fascia for accessing said hitch receiver with two doors and sliding said two doors together to close said opening.

9. The method of claim 8, including sliding said two doors apart to open said opening and access said hitch receiver.

* * * * *